W. & W. H. Lewis,
Photographic Bath,
№ 28,876. Patented June 26, 1860.

Witnesses
Lemuel W Serrell
Chas. H Smith

Inventors
Willm Lewis.
W H Lewis

UNITED STATES PATENT OFFICE.

WILLIAM LEWIS AND WILLIAM H. LEWIS, OF NEW YORK, N. Y.

IMPROVEMENT IN PHOTOGRAPHIC BATHS.

Specification forming part of Letters Patent No. 28,876, dated June 26, 1860.

*To all whom it may concern:*

Be it known that we, WILLIAM LEWIS and WILLIAM H. LEWIS, of the city and State of New York, have invented, made, and applied to use a certain new and useful Improvement in Photographic Baths; and we do hereby declare that the following is a full, clear, and exact description of the construction and operation of the same, reference being had to the annexed drawings, making part of this specification, wherein—

Figure 2:
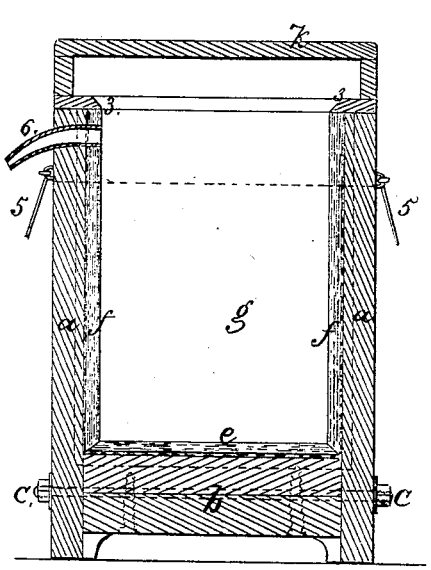
Figure 3:
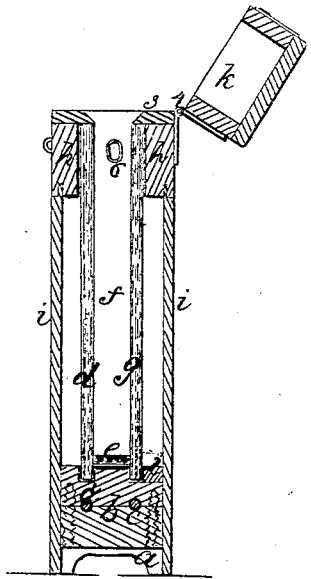
Figure 1:
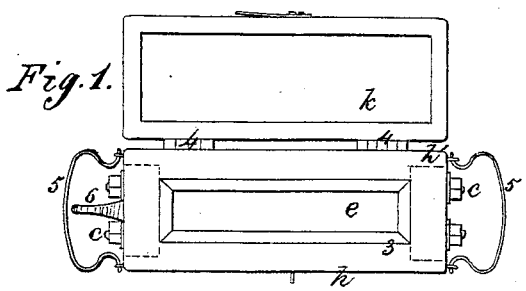
Figure 4:
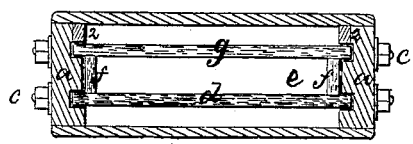

Figure 1 is a plan of our said bath as open. Fig. 2 is a vertical longitudinal section. Fig. 3 is a cross-section, and Fig. 4 is a sectional plan.

Similar marks of reference indicate the same parts.

Our said invention relates to a peculiar manner of forming baths for the nitrate of silver or other chemicals used for the photographic plates.

Heretofore wooden boxes have been made and lined with glass, and plates of glass have been kept apart by a strip of rubber and contained in a frame. In the former case the glass lining was not reliable and often became detached in consequence of any sudden jar. In the latter case the glass requires to be thick, besides which the india-rubber comes in contact with the chemical solution.

Our said invention obviates the foregoing objections, allowing of the entire lining being of glass, and at the same time the possibility of the pieces of glass becoming detached or broken is prevented.

We construct a frame composed of the sides $a\ a$ and bottom $b$, the inner surfaces of these pieces being grooved, as shown. We then take the glass $d$ and slide it into the grooves 1 1, having previously introduced into said grooves any suitable cement. We prefer asphaltum varnish. We then put on the piece $h$ next said glass and bed it down thereonto with putty between it and the glass. The ends of this piece $h$ are secured to the upper ends of the sides $a\ a$. We now have opportunity to pack the groove 1 full and tight on both sides of the glass with said cement. When this is done, we thoroughly coat the inside of the frame $a\ a\ b$ with cement and bed into it the side and bottom strips $e\ f\ f$, which are beveled at their meeting ends and thoroughly bedded in cement. The side glass $g$ is then laid up against these strips, thoroughly packed and bedded in cement and then secured by the strips 2 2. The other piece $h'$ is then attached in place with putty intervening between the upper part of the glass $g$ and said piece. The sides $i\ i$ are then nailed or otherwise attached to the frame $a\ a\ b$. The capping-pieces 3 3 complete the construction of the bath itself. The screws $c\ c$ may be used to strengthen the frame. The handles 5 5 are generally provided for the convenience of the operator, as also the overflow-pipe 6, usually introduced to prevent waste of the nitrate of silver solution in case the bath is too full, said pipe 6 leading to a bottle, and a hole may be bored in the glass $f$ to pass this pipe, or said glass terminate immediately below said pipe. The upper ends of the pieces $f\ f$ may be beveled outward to set up under an overhanging part of the cap 3' to retain them more securely in place; but we find it unnecessary.

$k$ is the ordinary cover to the bath hinged on at 4 4. It will now be seen that the glasses $d\ g$ are secured in place in such a firm manner and the edges so entirely surrounded by the frame and packed in the containing-grooves that leakage is impossible and any jar or sudden motion or blow is not liable to break the glass or crack the packing of cement, because the sides $i$ do not touch the glass. Our bath is cheap and reliable.

Having thus described the said invention, what we claim, and desire to secure by Letters Patent, is—

Securing the edges of the glasses $d\ g$ in grooves in the frame $a\ a\ b$ in the manner and for the purposes specified.

In witness whereof we have hereunto set our signatures this 2d day of June, 1860.

WILLM. LEWIS.
    W. H. LEWIS.

Witnesses:
 LEMUEL W. SERRELL,
 CHAS. H. SMITH.